United States Patent
Ueda et al.

(10) Patent No.: US 8,061,685 B2
(45) Date of Patent: Nov. 22, 2011

(54) SOLENOID VALVE HAVING A YOKE WITH AN EXTERNALLY-ACCESSIBLE FITTING HOLE

(75) Inventors: Masatoshi Ueda, Tokyo (JP); Tatsuya Matsumoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 12/666,195

(22) PCT Filed: May 30, 2008

(86) PCT No.: PCT/JP2008/001374
§ 371 (c)(1),
(2), (4) Date: Dec. 22, 2009

(87) PCT Pub. No.: WO2009/040968
PCT Pub. Date: Apr. 2, 2009

(65) Prior Publication Data
US 2010/0187458 A1    Jul. 29, 2010

(30) Foreign Application Priority Data

Sep. 28, 2007 (JP) ................................. 2007-255034

(51) Int. Cl.
*F16K 31/06* (2006.01)
(52) U.S. Cl. .................... 251/129.15; 335/281; 335/297
(58) Field of Classification Search ............. 251/129.15, 251/129.01; 335/281, 297
See application file for complete search history.

(56) References Cited

U.S. PATENT DOCUMENTS

| | | | |
|---|---|---|---|
| 3,116,047 A | | 12/1963 | Andresen, Jr. |
| 4,919,390 A | * | 4/1990 | Ichiryu et al. ............ 251/129.15 |
| 5,251,659 A | * | 10/1993 | Sturman et al. ................ 137/339 |
| 5,992,461 A | * | 11/1999 | Gilmore et al. .......... 137/625.65 |
| 6,003,839 A | * | 12/1999 | Kobayashi ................ 251/129.15 |
| 6,601,822 B2 | * | 8/2003 | Tachibana et al. ........ 251/129.15 |
| 6,851,622 B2 | * | 2/2005 | Demere et al. ..................... 239/5 |
| 6,929,242 B2 | * | 8/2005 | Kirsch et al. ............. 251/129.15 |
| 2005/0211938 A1 | * | 9/2005 | Ryuen et al. ............. 251/129.15 |
| 2006/0017031 A1 | * | 1/2006 | Hofling ..................... 251/129.07 |

FOREIGN PATENT DOCUMENTS

| | | |
|---|---|---|
| JP | 49-69010 U | 6/1974 |
| JP | 56-108212 U | 8/1981 |
| JP | 57-51073 A | 3/1982 |
| JP | 60-137284 U | 9/1985 |
| JP | 64-30719 A | 2/1989 |
| JP | 9-196223 A | 7/1997 |
| JP | 11-94117 A | 4/1999 |
| JP | 2004-251315 A | 9/2004 |

* cited by examiner

*Primary Examiner* — John Bastianelli

(74) *Attorney, Agent, or Firm* — Birch, Stewart, Kolasch & Birch, LLP

(57) ABSTRACT

A solenoid valve includes a tubular coil bobbin 12 having a coil 13 wound around the outer peripheral surface thereof, a core 8 arranged inside the coil bobbin 12, a yoke 7 for fixing the core 8, a plunger 10 having a central axis coaxial to that of the core 8 and being movable in the axial direction, and a valve housing 5 having ports 3, 4, wherein the yoke 7 is provided, in the outer surface thereof, with a fitting hole 7*d* projecting tubularly for receiving and fixing the core 8 inserted therein and securing it in place, and the core 8 is provided with a projection 8*a* to be inserted into the fitting hole 7*d* and a flange 8*b* to abut against the inner surface of the yoke 7.

5 Claims, 6 Drawing Sheets (a)

(b)

(a)

(b)

(a)

(b)

(c)

SOLENOID VALVE HAVING A YOKE WITH AN EXTERNALLY-ACCESSIBLE FITTING HOLE

TECHNICAL FIELD

The present invention relates to a solenoid valve or the like used for a vaporized fuel gas handling system that receives a vaporized gas from, e.g., a fuel tank, temporarily adsorbs the gas in a canister, and also supplies the vaporized gas in the canister to the inlet system of an engine.

BACKGROUND ART

A solenoid valve is a valve that generates a magnetic force by applying electric power to its solenoid coil, and controls the flow of a gasoline vapor or air flowing in a fluid passage by driving its valve plunger with the generated magnetic force. A solenoid valve is mounted, e.g., in an engine room, and controls the flow rate of gasoline vapor in a pipe by controlling the power applied to its solenoid coil. The magnetic circuit energized or generated by applying power to the solenoid coil is composed of magnetic members around a coil. In conventional solenoid valves, a bracket for attaching the valve to an outside system is secured to the outer periphery of a yoke by welding.

Thus, in conventional solenoid valves, a bracket and a yoke have been constituted by respective separate members; however, in recent years, to reduce the cost, a technology by which a bracket and a yoke are constituted by the same member has been widespread. Yet, even when a bracket and a yoke are constituted by the same member to be provided for a yoke-bracket, it is necessary to provide a fixed iron core supporting hole in the yoke-bracket in which a fixed iron core is inserted and fixed. The fixed iron core is joined in the supporting hole by welding, spinning, or punching (see, e.g., Patent Document 1). Further, as another fixing method, a technology by which the iron core is fittedly inserted and secured in the supporting hole of the yoke-bracket is also disclosed.
Patent Document 1: JP-A 2004-251315

Since the conventional solenoid valve has been arranged as described above, the following problem may occur: when a fixed iron core is fittedly inserted into and attached to a supporting hole provided in a yoke in order to reduce the cost, not only the weight of the fixed iron core but also that of internal constituent parts such as a coil and the like constituting a magnetic circuit are applied on the supporting hole, and stress caused by the vibration of an engine or the like is concentrated at the supporting hole, which results in deforming, breaking, or wearing out the supporting hole. To deal with such vibration problems, the increase of thickness of a yoke board or the change of material of a yoke board is contemplated; however, other problems may occur: the thickened yoke board makes the working process difficult; and the material-changed yoke board increases the cost.

The present invention has been made to solve the above-mentioned problems, and an object of the present invention is to provide a solenoid valve having high durability to the vibration of an engine or the equivalent without increasing the thickness of its yoke board or without changing the material of its yoke board.

DISCLOSURE OF THE INVENTION

The solenoid valve according to the present invention includes a tubular bobbin having an electromagnetic coil wound around the outer peripheral surface thereof; a fixed iron core disposed inside the bobbin; a yoke for fixing the fixed iron core; a moving iron core having a central axis identical to that of the fixed iron core and being movable in the axial direction; and a valve housing having a plurality of ports, wherein the yoke has, in the outer surface thereof, a fitting hole projecting tubularly for receiving and securing the fixed iron core inserted therein, and wherein the fixed iron core has an inserting section to be inserted into the fitting hole and a flange to abut against the inner surface of the yoke.

According to the present invention, it is arranged that the yoke is provided, in the outer surface thereof, with the fitting hole projecting tubularly, and the fixed iron core to be inserted into and secured to the fitting hole is provided with the inserting section to abut against the inner surface of the fitting hole and the flange to abut against the inner surface of the yoke. Thus, the contact area between the fixed iron core and the yoke is enlarged and thereby the durability to the vibration of an engines or the like is improved. Further, since the contact area between the fixed iron core and the yoke is enlarged, the magnetic field is not confined and the magnetic path can be sufficiently secured.

BEST MODE FOR CARRYING OUT THE INVENTION

Embodiments of the present invention will now be described with reference to the accompanying drawings in order to explain the present invention in more detail.

First Embodiment

Figure 2:
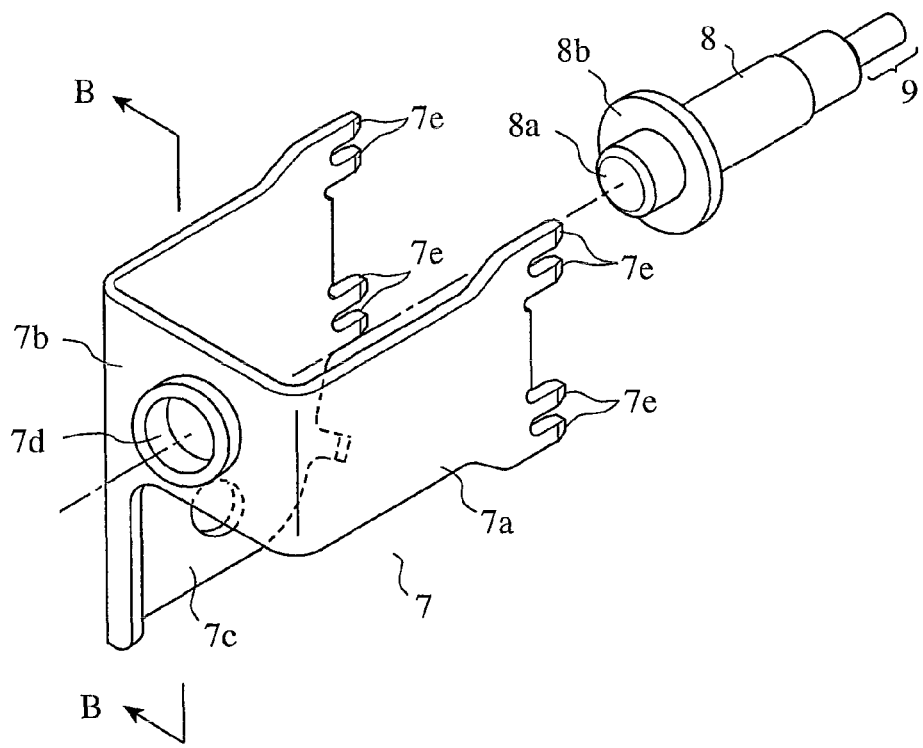
FIG. 2 is a perspective view showing the compositions of a yoke, a core, and a pin in accordance with the first embodiment of the invention.
Figure 3:
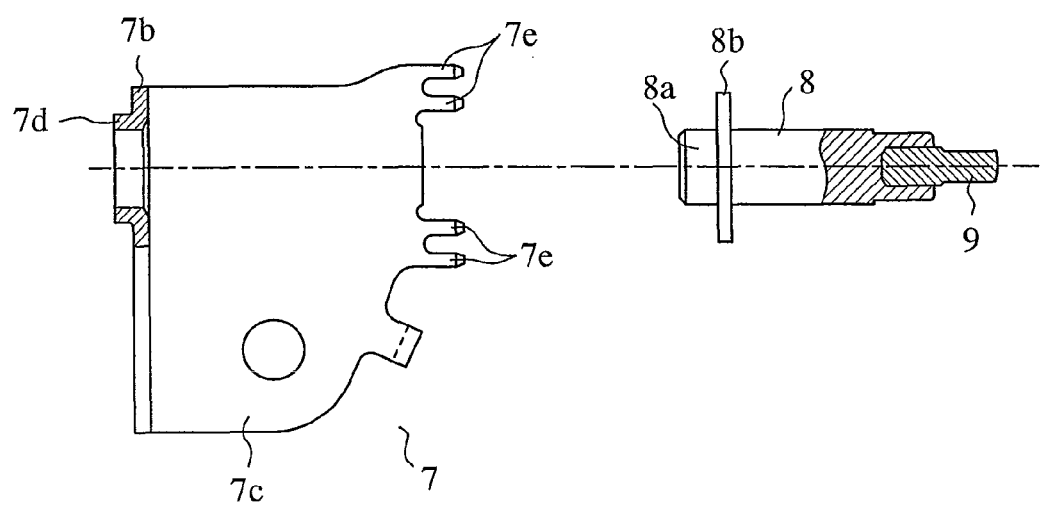
FIG. 3 is a side view showing the compositions of the yoke, the core, and the pin in accordance with the first embodiment of the invention.

The composition of a solenoid valve in accordance with the first embodiment of the present invention will be discussed using FIG. 1 to FIG. 3.

Figure 1:
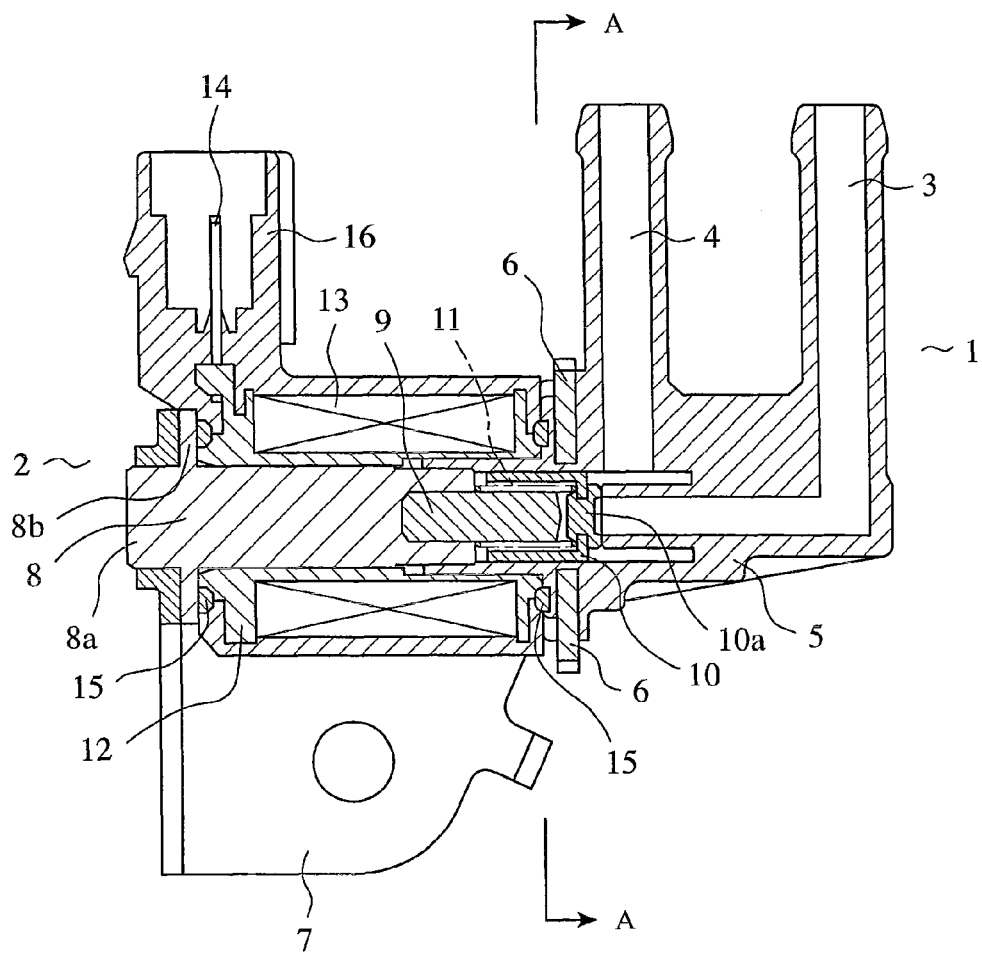
FIG. 1 is a longitudinal sectional view showing the composition of a solenoid valve in accordance with the first embodiment of the present invention.

FIG. 1 is a longitudinal sectional view showing the composition of a solenoid valve in accordance with the first embodiment of the present invention, and FIG. 1 illustrates a non-energized state of the solenoid valve. The solenoid valve is composed of a housing section 1 and a solenoid coil 2 generating a magnetic force. The housing section 1 is composed of ports 3, 4 connected to a canister (not shown) adsorbing vaporized gas from the fuel tank of a vehicle or the like or an inlet pipe (not shown) supplying a fuel-air mixture to an engine; a valve housing 5 covering the ports 3, 4 and other parts; and a valve plate 6 provided on the valve housing 5 and for attaching a yoke discussed later, thereon.

The solenoid coil 2 is composed of the yoke 7 covering internal constituent parts and formed of a magnetic material; a core (fixed iron core) 8 being a generally column-shaped fixed iron core and formed of a magnetic material; a generally column-shaped pin 9 inserted into the tip of the core 8 and formed of a non-magnetic material; a plunger (moving iron core) 10 being a moving iron core and formed of a magnetic material; and other components. The plunger 10 is formed in a substantially tubular shape having a central axis coaxial or common with those of the core 8 and pin 9. Moreover, the plunger 10 is provided in the center thereof with a valve plunger 10a formed of an elastic member. The valve plunger 10a is closing a flow path connecting the port 3 and port 4 in the non-energized state. Between the core 8 and the plunger 10, there is a spring 11 urging the plunger 10 in the direction such that the plunger 10 is disengaged from the core 8. The valve plunger 10a closes or opens the flow path connecting the port 3 and port 4 by the urging force of the spring 11.

The core 8 has a coil assembly (not shown) disposed around the outer periphery thereof. The coil assembly is formed by winding a coil (electromagnetic coil) 13 around the outer periphery of a coil bobbin (bobbin) 12, inserting a terminal 14 into the end of the coil 13, and then covering those parts with a coil exterior 16. The core 8 is sandwichedly held between the coil assembly and the yoke 7 by the flange thereof which will be described later. Further, an O-ring 15 formed of an elastic member is provided between the flange and the coil assembly.

Upon generation of a magnetic field by energizing the coil 13 through the terminal 14, since the valve plate 6, yoke 7, and core 8 are formed of a magnetic material, a magnetic path passing the valve plate 6, yoke 7, and core 8 is created to thus electromagnetically attract the plunger 10.

Next, the details of the yoke 7, core 8, and pin 9 will now be discussed by referring to FIG. 2 and FIG. 3. FIG. 2 is a perspective view showing the compositions of the yoke 7, core 8, and pin 9 in accordance with the first embodiment of the present invention, and FIG. 3 is a side view showing the compositions of the yoke 7, core 8, and pin 9 in accordance with the first embodiment of the present invention.

The yoke 7 is molded in a substantially U-shape, and has three faces of a first face 7a, a second face 7b, and a third face 7c. The second face 7b is provided with a tubular fitting hole 7d projecting in the vertical direction to the outer surface thereof. At each of the four ends of the first face 7a and the third face 7c, two of lock pieces 7e are provided. The lock pieces 7e are engaged into the valve plate 6 correspondingly to secure the yoke 7 to the housing section 1 of the plate.

The core 8 has a cylindrical inserting section 8a on one end thereof. The inserting section 8a is formed in a shape fittable in the fitting hole 7d formed through the second face 7b of the yoke 7, and has a tapered surface for facilitating insertion into the fitting hole 7d around the periphery of the tip thereof. Further, the core 8 has a flange 8b in the vicinity of the inserting section 8a, and when the inserting section 8a is fit in the fitting hole 7d, the flange 8b abuts against the inner surface of the second face 7b of the yoke 7. Meanwhile, the core 8 has housed at the other end thereof a pin 9 having a central axis coaxial with that of the core 8.

Figure 4:
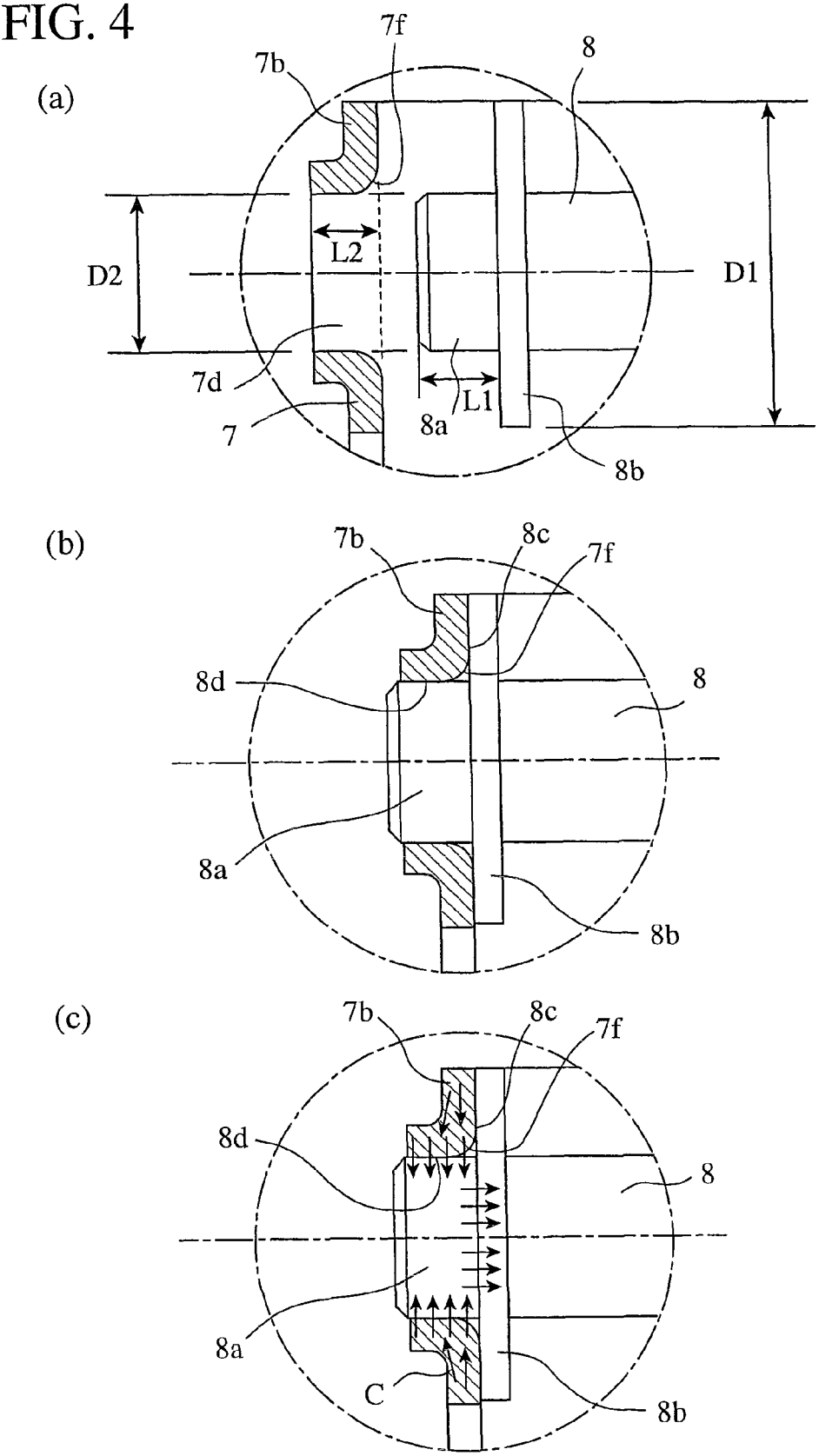
FIG. 4 is a view showing the main part of the yoke and the core in accordance with the first embodiment of the invention.

FIG. 4 is a view showing the main part of the yoke 7 and the core 8 in accordance with the first embodiment of the present invention. FIG. 4(a) is a side sectional view showing a state before inserting the inserting section 8a of the core 8 into the fitting hole 7d of the yoke 7, FIG. 4(b) is a side sectional view showing a state after inserting the inserting section therein, and FIG. 4(c) is a view showing a magnetic path formed between the yoke 7 and core 8.

As shown in FIG. 4(a) and FIG. 4(b), the yoke 7 is provided, through the second face 7b thereof, with the fitting hole 7d projecting in the vertical direction to the outer surface thereof. The fitting hole 7d is formed by applying draw forming on the second face 7b so as to raise a portion in the shape of a cylinder, and thereby the raised portion 7f of the inner peripheral surface of the fitting hole 7d is provided with a rounded surface (R-surface). The rounded surface formed around the raised portion 7f improves the insertability of the inserting section 8a into the fitting hole 7d. Thus, by forming the fitting hole 7d by draw forming, the rounded surface can be formed around the raised portion 7f at the time when the fitting hole 7b is formed. Meanwhile, the tip of the inserting section 8a has been also provided, around the outer peripheral portion thereof, with the tapered surface or the rounded surface, and thus the insertion into the fitting hole 7d in the assembling process furthermore improves.

Upon insertion of the inserting section 8a into the fitting hole 7d as shown in FIG. 4(b), the flange 8b comes in contact with the inner surface of the second face 7b. By forming the flange 8b with a larger outer diameter D1 to enlarge the contact area of the contact portion 8c between the flange 8b and the inner peripheral surface of the second face 7b, when the yoke 7 and the core 8 are vibrated by the vibration of an engine or the like, the stress caused by the vibration can be diffused to reduce the concentration of the stress, thereby enhancing durability to vibration. In such a way, by providing the flange 8b and further forming the flange 8b so as to have a large outer diameter D1, the fixation between the yoke 7 and the core 8 may be strengthened to enhance the durability to vibration.

Similarly, upon insertion of the inserting section 8a into the fitting hole 7d, the inner peripheral surface of the fitting hole 7d comes in contact with the outer peripheral surface of the inserting section 8a. By forming the inner diameter of the fitting hole 7d and the outer diameter D2 of the inserting section 8a bigger in order to enlarge the contact area of the contact portion 8d between the inner peripheral surface of the fitting hole 7d and the outer peripheral surface of the inserting section 8a, and also by forming the fit length L1 of the inserting section 8a and the fit length L2 of the fitting hole 7d longer in order to enhance the holding property of the core 8, when the yoke 7 and the core 8 are vibrated by the vibration of an engine or the like, the stress produced by the vibration can be diffused to reduce the concentration of the stress, thus improving the durability to vibration. Furthermore, by enlarging the contact area of the contact portion 8d, the magnetic path can be enlarged to enhance the magnetic efficiency.

FIG. 4(c) illustrates the flow of the magnetic field by the arrows C. The electromagnetic force generated in the coil 13 is transmitted to the yoke 7, and further transmitted from the fitting hole 7d of the yoke 7 to the inserting section 8a of the core 8 and the core 8 through the contact portion 8d. Since the fitting hole 7d is formed so as to project in the vertical direction to the outer peripheral surface of the second face 7b, the contact area between the fitting hole 7d and the contact portion 8d of the inserting section 8a is enlarged and the magnet path is increased accordingly, which can improve the magnetic efficiency.

Figure 5:
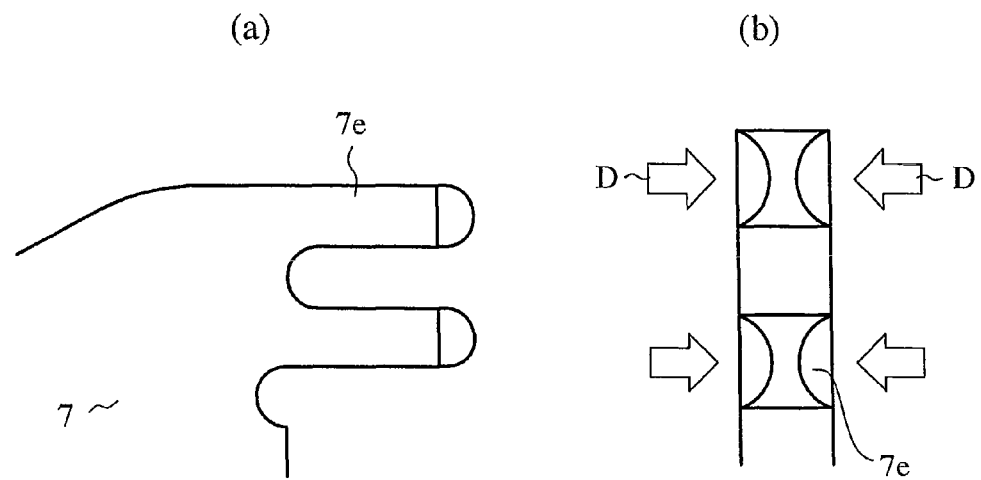
FIG. 5 is a view showing the composition of a lock piece in accordance with the first embodiment of the invention.
Figure 6:
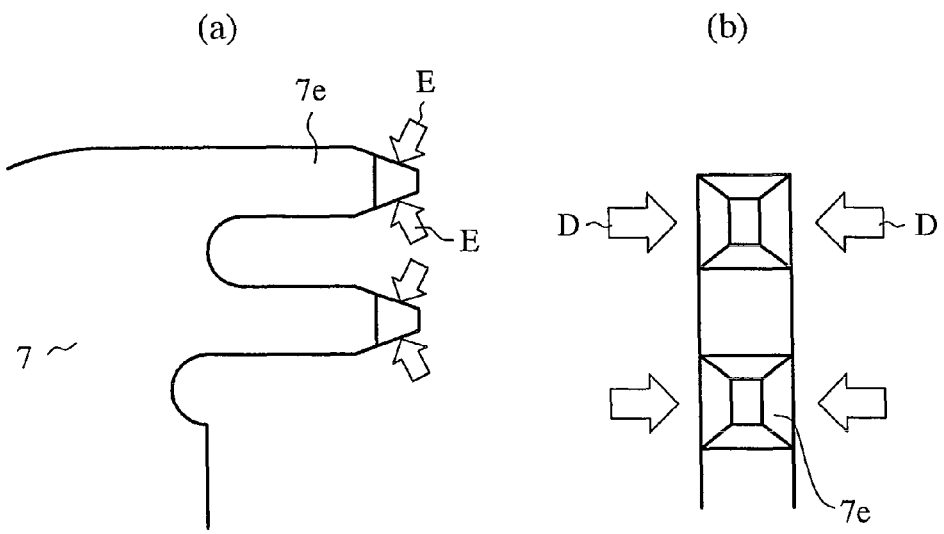
FIG. 6 is a view showing the composition of a lock piece in accordance with the first embodiment of the invention.

Next the details of the lock pieces 7e provided on the yoke 7 will be described as follows: FIG. 5 and FIG. 6 are views showing the compositions of the lock pieces 7e in accordance with the first embodiment of the present invention.

FIG. 5 shows an example where the lock piece 7e is provided with a rounded surface at the tip thereof, and then side faces in the vicinity of the tip are provided with tapered surfaces. FIG. 5(a) is a view of the lock piece 7e viewed from side and FIG. 5(b) is a view of the lock piece 7e viewed from above. First, as shown in FIG. 5(a), the tip of the lock piece 7e is provided with a rounded surface. Then, the side faces in the vicinity of the tip of the lock piece 7e are worked by hammering, pressing, or the like from the direction indicated by the arrow D shown in FIG. 5(b), and thereby two tapered surfaces tapered toward the tip of the lock piece 7e are formed.

FIG. 6 shows an example where the tip of the lock piece 7e is provided with a plane surface at the tip end and then the side faces of the vicinity of the tip is provided with a tapered surface. FIG. 6(a) is a view of the lock pieces 7e viewed from side, and FIG. 6(b) is a view of the lock pieces 7e viewed from above. First, the side faces of the vicinity of the tip of the lock piece 7e are worked by hammering, pressing, or the equivalent from the four directions indicated by the arrow D and the arrow E shown in the figure, and thereby, four tapered surfaces tapered toward the tip of the lock piece 7e are formed.

As in the examples shown in FIG. 5 and FIG. 6, since the lock piece 7e is arranged to be tapered toward the tip to form tapered surfaces on the side faces in the vicinity of the tip of the lock piece 7e, the insertability of the lock piece 7e inserted into the valve plate 6 can be improved. Further, since the lock piece 7e is arranged to have a rounded surface or a plane surface at the tip end thereof, the occurrence of snags caused by a possible acute shape of the tip end can be suppressed, thereby facilitating the insertion in assembly, and also improving safety such as prevention of injury in actual use.

Figure 7:
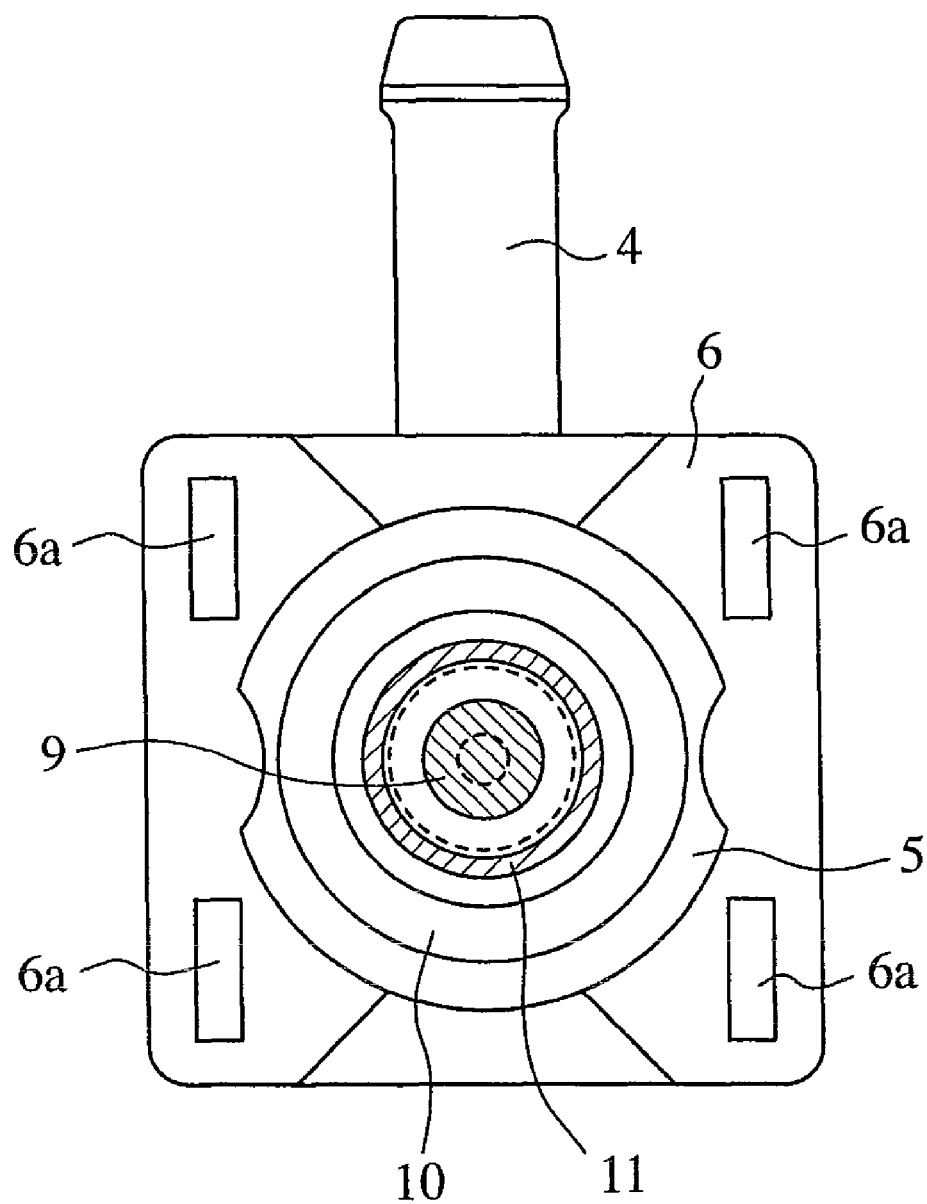
FIG. 7 is a sectional view taken along the line A-A in FIG. 1.

FIG. 7 is a sectional view taken along the line A-A in FIG. 1, and shows the details of the valve plate 6 where the yoke 7 is attached. Engaging holes 6a are provided at the four corners of the valve plate 6, respectively. The engaging hole 6a is rectangular, and has a shape which can accommodate simultaneously the two of lock pieces 7e provided at the first face 7a and the third face 7c of the yoke 7 to be inserted into the respective engaging holes. Further, since the lock piece 7e has a tapered shape at the tip thereof, the engaging hole 6a can be designed in a small shape and the outer diameter of the valve plate 6 and the width of the yoke 7 can be reduced.

Figure 8:
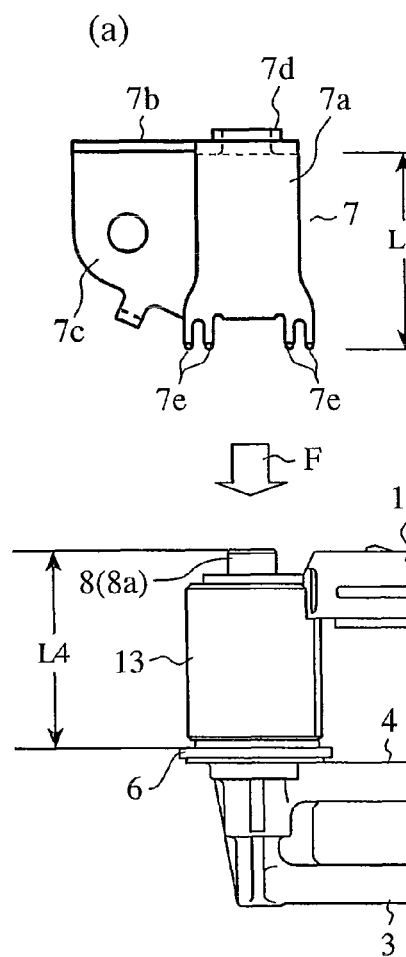
FIG. 8 is a view showing the mounting process of the yoke in accordance with the first embodiment of the invention.
Figure 8:
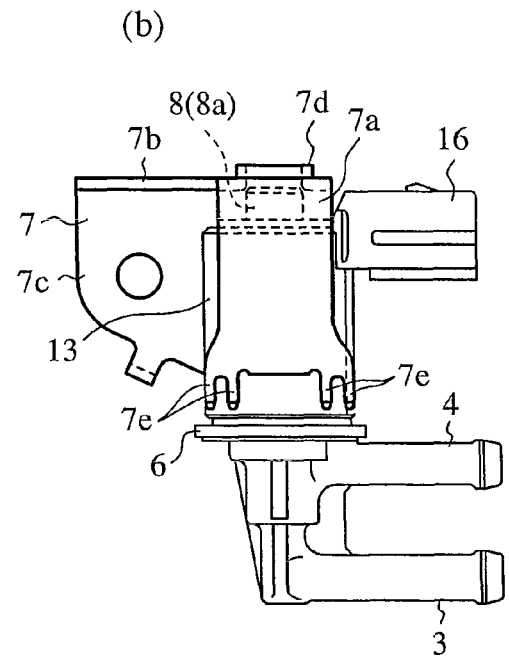
Figure 8:
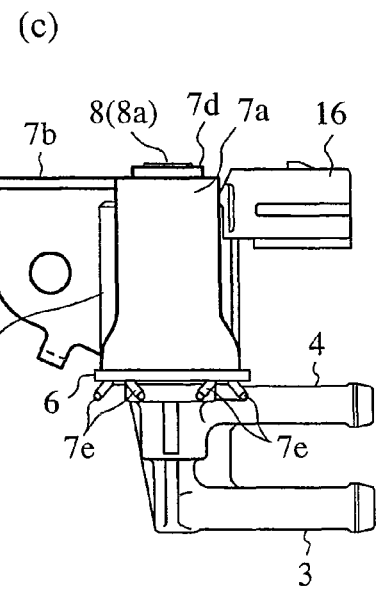

Next the operation of mounting the yoke 7 on the valve plate 6 is described: FIG. 8 is a view showing the mounting process of the yoke in accordance with the first embodiment of the present invention.

First, as shown in FIG. 8(a), the core 8, the coil 13, and other parts are disposed on the valve plate 6, and the yoke 7 is lowered from above the core 8 and the coil 13 toward the direction indicated by the arrow F shown in the figure. The yoke 7 is lowered to the position shown in FIG. 8(b), and the inserting section 8a of the core 8 is fit in the fitting hole 7d of the yoke 7. In this manner, the positions of the lock pieces 7e of the yoke 7 are substantially determined, and thus the positioning accuracy improved when the lock pieces 7e are inserted in the engaging holes 6a, facilitating the assembling process.

In addition, in order to simultaneously perform the positioning of the fitting hole 7d and the inserting section 8a and the positioning of the engaging holes 6a and the lock pieces 7e, as shown in FIG. 8(a), where the length L3 of the yoke 7 excluding the portion formed for the fitting hole 7d and the length L4 between the upper surface of the valve plate 6 and the upper end of the inserting section 8a of the core 8 are provided, it is required to satisfy the relation of L3<L4.

When the yoke 7 is further lowered under the condition where the positioning of the fitting hole 7d and the inserting section 8a and the positioning of the engaging holes 6a and the lock pieces 7e have been performed, the inserting section 8a fits in the fitting hole 7d as shown in FIG. 8(c), and the two of lock pieces 7e provided at the four places in the yoke 7 are inserted into the respective engaging holes 6a. Thereafter, the two lock pieces 7e inserted in one engaging hole 6a are outwardly bent or caulked so as to be in a truncated chevron shape as shown in FIG. 8(c), and thereby the yoke 7 is locked on the valve plate 6.

Next the operation of the solenoid valve is described:

The port 3 and port 4 are connected to a canister (not shown) adsorbing a vaporized gas from the fuel tank of a vehicle or the like, or to an inlet pipe (not shown) supplying a fuel-air mixture to an engine. Upon opening of the solenoid valve, the vaporized gas adsorbed in the canister is aspirated by the negative pressure generated thereby in the inlet pipe, and is supplied to the engine. In the flow path connecting the port 3 and port 4, the valve plunger 10a formed integral with the plunger 10 is disposed.

The solenoid valve is opened and closed by energizing or non-energizing the coil 13. When the coil 13 is non-energized, the plunger 10 having the valve plunger 10a is pressed in the direction disengaging the plunger from the core 8 by the urging force of the spring 11, and the valve plunger 10a closes the flow path connecting the port 3 and the port 4. On the other hand, upon start of energization to the coil 13, a magnetic field is generated in the coil 13, and a magnetic path passing the yoke 7, core 8, and valve plate 6 is formed. When the magnetic path is formed, the plunger 10 is electromagnetically attracted to the core 8 against the urging force of the spring 11, and the flow path connecting the port 3 and port 4 is opened.

As discussed above, in accordance with the first embodiment, since it is arranged that the tubular fitting hole projecting in the vertical direction to the outer surface of the yoke is provided (at the yoke) and also the inserting section is provided at the tip of the core to be inserted into the fitting hole, the contact area between the inner peripheral surface of the fitting hole and the outer peripheral surface of the inserting section can be enlarged. Further, by virtue of enlarging the contact area between the fitting hole and the inserting section, when the yoke and core are vibrated, the concentration of the stress caused by the vibration on the fitting hole can be prevented, and thereby the fitting hole is prevented from being deformed, broken, and worn down. Moreover, since the contact area between the fitting hole and the contact portion of the inserting section is enlarged, the magnetic path is not confined in the contact portion and a sufficient magnetic path can be secured.

Furthermore, in accordance with the first embodiment, it is arranged that the core is provided with the projecting inserting section and the inserting section is provided in the vicinity thereof with the flange so that the flange, when the inserting section is inserted into the fitting hole of the yoke, abuts against the yoke, and thus, even when the yoke, core, and other parts are vibrated, it is possible to hold the core with diffusing the stress caused by the vibration to the inserting section of the core, the fitting hole of the yoke, and the abutting portion between the flange and the yoke. Thus, the fitting hole can be prevented from being deformed, broken, and worn down, and thereby the fluttering of the internal parts caused by the vibration can be restrained.

Besides, in accordance with the first embodiment, it is arranged that the fitting hole is formed in a tubular shape by raising from the yoke by draw forming, and thus the raised portion of the inner peripheral surface of the fitting hole has a rounded surface to improve the insertability of the inserting section. Further, it is arranged that the inserting section also have the tapered surface or the rounded surface around the outer peripheral portion of the tip thereof, and thus the insertability of the inserting section to the fitting hole can be further improved.

Moreover, in accordance with the first embodiment, since it is arranged that the lock pieces of the yoke is positioned to the engaging holes of the valve plate concurrently with the positioning of the fitting hole of the yoke to the inserting section of the core, the positioning accuracy when the lock pieces are inserted into the engaging holes can improve.

Furthermore, in accordance with the first embodiment, since it is arranged that each of the lock pieces is tapered toward the tip thereof, when the lock pieces are inserted into the engaging holes, it can be worked as a guiding part and therefore improves the productivity in assembly. Additionally, the contact resistance when the lock piece is inserted into the engaging hole is reduced and the insertability thereof is enhanced.

In the first embodiment discussed above, the arrangement is shown, in which the yoke is processed worked by draw forming to form the fitting hole projecting in the vertical direction to the outer peripheral surface of the yoke; however, it may be arranged that the projecting portion of the fitting hole is formed by attaching a separate member to the outer peripheral surface of the yoke by welding or the like. When the yoke is thus provided with the fitting hole by attaching a separate member, the inner peripheral surface of the fitting hole needs to be processed by tapering or rounding to provide a guide surface for facilitating the insertion of the inserting section of the core thereinto.

Moreover, in the first embodiment described above, an example is shown, in which the lock piece of the yoke is provided, at the tip thereof, with a rounded surface, or the tip and the side face of the lock piece is provided with a plane surface formed by hammering, pressing or the like; however, the processing method is not limited to those as long as the lock piece has a shape tapered toward the tip thereof.

Further, in FIGS. 1-4 shown in the first embodiment discussed above, the composition in which the flange having a circular shape is formed is shown; however, the shape of the flange is not limited to that, and the core may have a couple of flanges projecting from the two places of the core or flanges projecting from a plurality of places of the core.

INDUSTRIAL APPLICABILITY

As discussed hereinabove, the solenoid valve according to the present invention is arranged such that the contact area between the fixed iron core and the yoke is enlarged to improve the durability to the vibration of an engine or the like and also maintain a sufficient magnetic path without confining the magnetic field, and thus the solenoid valve is suitable for use, e.g., in a solenoid valve or the like used for a vaporized fuel gas handling system for supplying the vaporized gas in a canister to the inlet system of an engine.

The invention claimed is:
1. A solenoid valve including:
a tubular bobbin having an electromagnetic coil wound around the outer peripheral surface thereof;
a fixed iron core disposed inside the bobbin;
a yoke for fixing the fixed iron core;
a moving iron core having a central axis coaxial to that of the fixed iron core and being movable in the axial direction; and
a valve housing having a plurality of ports,
wherein the yoke has, in the outer surface thereof, a ring projecting tubularly in a direction perpendicular to the plane of the outer surface, said ring defining a fitting hole for receiving and fixing the fixed iron core inserted therein, and
wherein the fixed iron core has an inserting section to be inserted into the fitting hole and a flange to abut against the inner surface of the yoke.
2. The solenoid valve according to claim 1, wherein the fitting hole has an insertion guide surface for guiding insertion of the fixed iron core around the inner peripheral portion where the fixed iron core is inserted thereof.
3. The solenoid valve according to claim 1, wherein the solenoid valve further has a valve plate for fixing the yoke, and
wherein the length of the yoke excluding the projecting fitting hole in the insertion direction is shorter than the length between the upper surface of the valve plate and the upper end of the inserting section of the fixed iron core when the electromagnetic coil and the fixed iron core are assembled on the valve plate.
4. A solenoid valve including:
a tubular bobbin having an electromagnetic coil wound around the outer peripheral surface thereof;
a fixed iron core disposed inside the bobbin;
a yoke for fixing the fixed iron core;
a valve plate for fixing the yoke, said valve plate having an engaging hole for securing the yoke therein;
a moving iron core having a central axis coaxial to that of the fixed iron core and being movable in the axial direction; and
a valve housing having a plurality of ports,
wherein the yoke has, in the outer surface thereof, a ring projecting tubularly in a direction perpendicular to the plane of the outer surface, said ring defining a fitting hole for receiving and fixing the fixed iron core inserted therein, wherein the yoke has a lock piece insertable into the engaging hole and the tip part of the lock piece is tapered at an acute angle toward the tip thereof, and
wherein the fixed iron core has an inserting section to be inserted into the fitting hole and a flange to abut against the inner surface of the yoke.
5. The solenoid valve according to claim 1, wherein the fitting hole is formed by a drawing process.

* * * * *